United States Patent [19]
Avery

[11] 3,996,609
[45] Dec. 7, 1976

[54] AMPLIFIER SUITABLE FOR USE AS A COLOR KINESCOPE DRIVER

[75] Inventor: Leslie Ronald Avery, Lightwater, England

[73] Assignee: RCA Corporation, New York, N.Y.

[22] Filed: Oct. 22, 1975

[21] Appl. No.: 624,898

[30] Foreign Application Priority Data
May 5, 1975   United Kingdom ............. 17249/75

[52] U.S. Cl. .................................. 358/30; 358/39; 358/40
[51] Int. Cl.² .................. H04N 9/50; H04N 9/535; H04N 9/537
[58] Field of Search ................... 358/21, 39, 40, 30

[56] References Cited
UNITED STATES PATENTS
3,701,843   10/1972   Hepner et al. ........................ 358/30

Primary Examiner—Robert L. Richardson
Attorney, Agent, or Firm—Eugene M. Whitacre; Peter M. Emanuel; Ronald H. Kurdyla

[57] ABSTRACT

A color kinescope matrix amplifier has a first input coupled through a capacitor to a source of color difference signals. Another input is coupled to a source of luminance signals. The matrix amplifier includes a cascode output stage direct current coupled to a cathode of a kinescope. A portion of a direct voltage developed at the cascode output amplifier is coupled to one input of a comparator circuit. The other input of the comparator circuit is coupled to a temperature compensated direct voltage reference source. The comparator is rendered operative during horizontal retrace intervals to provide a current to either charge or discharge the input capacitor in accordance with the difference between the voltage at the output of the cascode output amplifier and the reference voltage to compensate for voltage variations at the output of the cascode amplifier due to power supply variations and the like. To compensate for droop caused by the discharge of the input capacitor during the scanning interval, one input of a differential amplifier is included between the input capacitor and the input of the cascode output stage. Negative signal feedback is provided from the output stage to the other input of the differential amplifier via a capacitor arranged to be charged during the horizontal retrace interval. The two capacitors discharge at substantially the same rates during the scanning interval. By virtue of the common mode operation of the differential amplifier droop effects are minimized.

11 Claims, 1 Drawing Figure

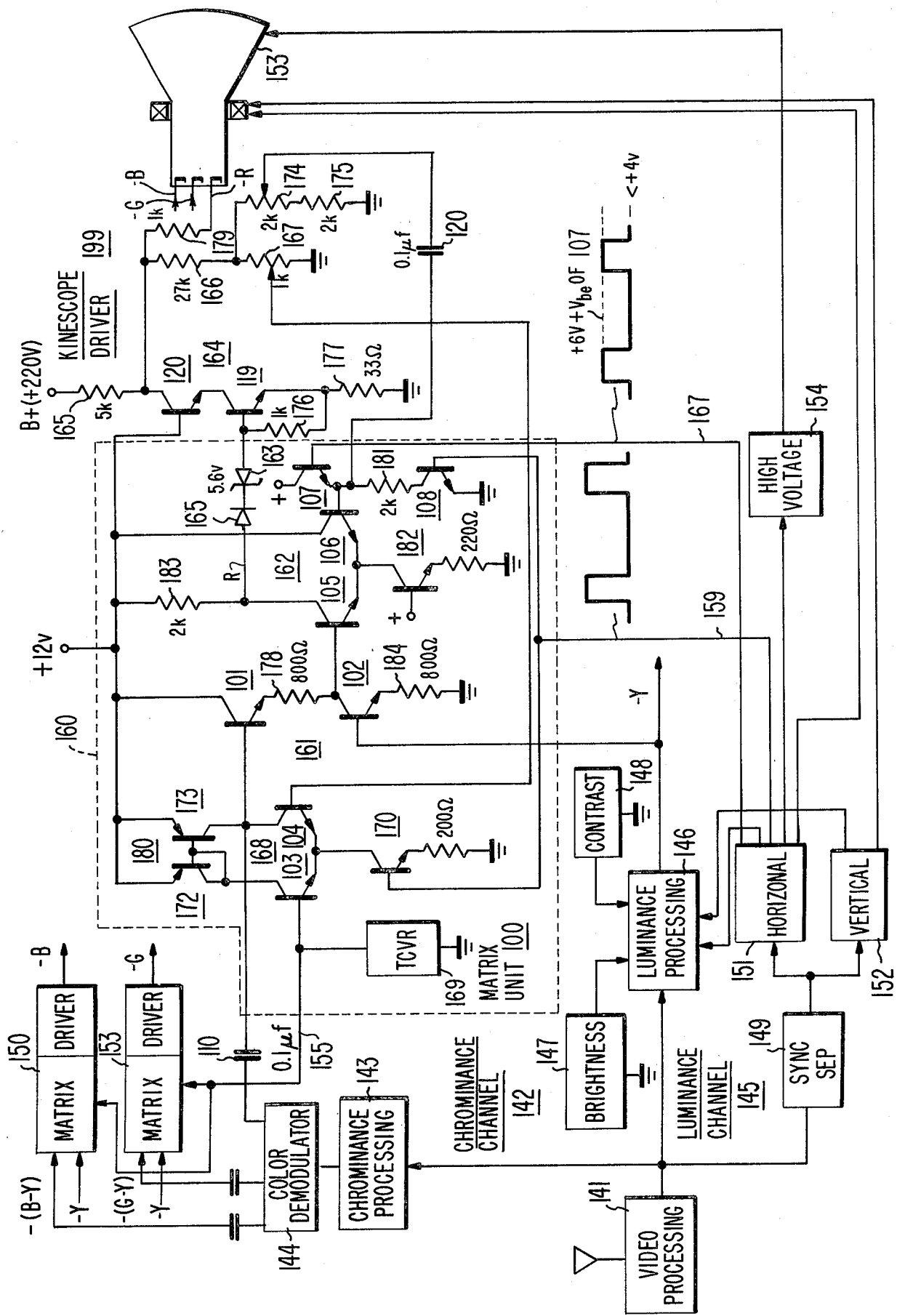

AMPLIFIER SUITABLE FOR USE AS A COLOR KINESCOPE DRIVER

The present invention is directed to the field of amplifiers and is particularly directed to the field of amplifier arrangements utilized to drive color image reproducing devices such as kinescopes.

The electron guns of a color kinescope are typically driven by separate amplifier stages. Variations of the operating conditions of an amplifier stage, such as variations of the stage's supply voltage, tend to produce variations in the brightness of a reproduced image. Furthermore, because each of the stages tends to operate at different power dissipation levels the operating conditions of the stages vary with respect to each other and hence color imbalances may occur.

Athough supply voltge regulators and high level clamping circuits have been employed in conjunction with kinescope amplifier stages to inhibit the aformentioned problems, it is desirable to provide kinescope driver amplifier arrangements which maintain their operating point stability with variations in operating conditions such as power supply variations without the need of supply voltage regulators or high level clamping circuits.

Furthermore, it is desirable, because of the trend toward miniaturization in electronic art, that at least a portion of the kinescope amplifierdriver should be able to be constructed in integrated circuit form.

It is also desirable to provide kinescope driver amplifier arrangements which include independent controls for adjusting the DC level and the AC amplitude of the signals coupled to the kinescope. This is particularly desirable where "precision-in-line" kinescopes or the like, in which the electron guns have common control electrodes, are employed since, in these types of kinescopes, it is difficult to independently adjust the operating conditions associated with the respective guns because of the commonality of control electrodes.

Furthermore, it is desirable that a kinescope driver amplifier which is to be utilized with a precision-in-line type of kinescope provide a relatively wide bandwidth without the requirement of high frequency peaking coils. Peaking coils tend to be bulky. In addition, undesirable voltages may be developed across a peaking coil due to the large magnetic fields which may be produced by the yokes associated with a precision-in-line kinescope. These undesirable voltages may produce disconcerting brightness and/or hue changes.

In accordance with the present invention, one input terminal of amplifying means is coupled to a source of chrominance signals through capacitive means. A second input of the amplifying means is direct current coupled to a source of luminance signals. The output terminal of the amplifying means is direct current coupled to a color image reproducing device such as a precision-in-line kinescope of the like. The amplifying means includes means for combining the luminance and chrominance signals to provide the image reproducing device with color signals. The amplifying means also includes comparator means for comparing the voltage developed at the output terminal to a reference voltage to generate a current to control the charging of the capacitive means in a manner so as to counter-act the changes of the voltage developed at the output due, for example, to changes in the power supply voltage. The comparator means is arranged to be normally inoperative and is selectively rendered operative during the horizontal retrace interval.

In accordance with another aspect of the present invention, the amplifying means includes a differential amplifier having first and second input terminals and an output terminal. The output terminal of the differential amplifier is coupled to the output terminal of the amplifying means. The first input terminal of the differential amplifier is coupled to the input terminal of the amplifying means. The second input terminal of the differential amplifying means is coupled to a second capacitive means. Means are provided for selectively charging the second capacitive means during the horizontal retrace interval. The first and second capacitive means are selected to have substantially equal discharging rates so as to compensate for any decrease in the DC content (i.e., droop) at the output terminal of the amplifying means during the scanning interval.

In accordance with still another feature of the present invention, the second capacitive means is coupled to the output terminal of the amplifying means in a manner so as to allow adjustment of the AC gain of the amplifying means. The DC conditions of the output of the amplifying means may be controlled by controlling the portion of the voltage developed at the output terminal coupled to the comparator means.

The present invention may best be understood by reference to the following detailed description and accompanying drawing which shows, partially in block diagram form and partially in schematic form, the general arrangement of a color television receiver employing a kinescope driver amplifier arrangement constructed in accordance with the present invention.

The color television receiver includes a video signal processing unit 141 responsive to radio frequency (RF) signals, received by an antenna, for receiving in a known manner, a composite video signal comprising chrominance, luminance, sound and synchronizing signal components.

The output of video processing unit 141 is coupled to a chrominance channel 142 including a chrominance processing unit 143 and a color demodulator 144. Chrominance processing unit 143 separates chrominance signals from the composite video signal. Color demodulator 144 derives signals of the appropriate polarity representing, for example, R–Y, G–Y and B–Y color difference signal information from the chrominance signals. The TAA630 integrated circuit or similar circuit is suitable for use as color demodulator 144.

The output of video processing unit 141 is also coupled to a luminance channel 145 including a luminance processing unit 146 which amplifies and processes luminance components of the composite signal to form an output signal of the appropriate polarity representing luminance, Y, information. A brightness control unit 147 to control the DC content of luminance signal Y and a contrast control unit 148 to control the amplitude of luminance signal Y are coupled to processing unit 146.

The composite video signal is also coupled to a sync separator 149 which, in turn, is coupled to a horizontal deflection unit 151 and a vertical deflection unit 152. Horizontal deflection unit 151 is also coupled to a high voltage unit 154 which generates operating voltages for kinescope 153. Outputs from horizontal deflection unit 151 and vertical deflection unit 152 are coupled to luminance processing unit 146 to inhibit or blank luminance signal Y during the horizontal and vertical retrace intervals. Similarly, an output from horizontal deflection unit 151 may be coupled to chroma processing unit 143 or color demodulator 144 to inhibit the color difference signals during the horizontal retrace interval. Furthermore, first and second signals including positive going pulses, the pulses of each signal being coincident with the horizontal retrace or blanking interval, are coupled to matrix unit 100 to control its operatin, as will appear below, via conductors 159 and 167, respectively.

The R–Y output signal and luminance signal Y are coupled to a matrix unit 100 where they are combined to form a color signal representing red (R) information. Similarly, the B–Y and G–Y color difference signals are respectively coupled to matrix-driver units 150 and 157, similar to the combination of matrix unit 100 and kinescope driver 199, where they are matrixed with luminance signal Y to produce color signals representing blue (B) and green (G) information. Since the matrix units for the various color difference signals are similar, only matrix unit 100 will be described in detail.

Matrix unit 100, enclosed within dotted line 160, is suitable for construction as an integrated circuit. The R–Y color difference signal is coupled through a capacitor 110 to the base of an NPN transistor 101 which is arranged as a common collector amplifier for color difference signals. Transistor 101, NPN transistor 102, resistors 178 and 184 form a summing circuit 161 for the color difference signal and luminance signal Y, the latter being direct current coupled to the base of transistor 102. The combined output of circuit 161, taken at the collector of transistor 102, is coupled to the base of an NPN transistor 105. Transistor 105 and an NPN transistor 106 form a differential amplifier 162 to which bias current is supplied from a current source including a suitably biased transistor 182. The output of differential amplifier 162, taken at the collector of transistor 105, is coupled through a level shifter, shown as the series connection of a zener diode 163, and a diode 165 to a kinescope 199. Bias current is provided for zener diode 163 and diode 165 through a resistor 183, which serves as the load resistor of transistor 105, and resistors 176 and 177.

Kinescope driver 199 comprises a cascode amplifier 164 including NPN transistors 120 and 119. The output of matrix unit 100 is coupled to the base of transistor 119 while a positive supply voltage (e.g. +12 volts) is coupled to the base of transistor 120. The output of kinescope driver 199, taken at the collector of transistor 120 is direct current coupled through a resistor 179 to the red (R) cathode of kinescope 153. The collector of transistor 120 is coupled to a source of supply voltage B+ through a load resistor 165. Supply voltage B+ is a relatively high voltage, typically, in the order of 200 to 300 vdc.

The collector of transistor 120 is also coupled to a series combination of a resistor 166 and a black level setting potentiometer 167, the latter being returned to ground. A direct voltage proportional to that at the collector of transistor 120 is developed at the wiper arm of potentiometer 167 and is coupled to one input of a voltage comparator circuit 168. Comparator 168 comprises NPN transistors 103 and 104 coupled as a differential amplifier. A second input of comparator 168, at the base of transistor 103, is coupled to a temperature compensated voltage reference (TCVR) unit 169. Voltage reference unit 169, which may, for example, be similar to that employed in the CA3085 integrated circuit manufactured by RCA Corporation, supplies a regulated reference voltage of approximately 1.6 vdc.

Voltage reference unit 169 is also coupled to the matrix portions of units 150 and 157 via conductor 155 so that a common reference voltage is coupled to the respective comparators of units 100, 150 and 157. It is noted that matrix unit 100 and the matrix portions of units 150 and 153 may be constructed as a single integrated circuit.

A current source including an NPN transistor 170 is coupled to the jointly connected emitters of transistors 103 and 104. The first horizontal blanking pulse signal generated by horizontal deflection unit 151 is coupled to the base of transistor 170 via conductor 159.

The output of differential amplifier 168 provided at the collector of NPN transistor 103 is converted to a bidirectional current by means of a current mirror circuit 180 comprising a diode-connected PNP transistor 172 and a PNP transistor 173. The collector of transistor 173 is coupled to the collector of transistor 104 and to the base of transistor 101.

The junction of resistors 166 and 167 is coupled to a signal feedback circuit comprising a series connection of a potentiometer 174 and a resistor 175. Feedback voltage developed at the wiper arm of potentiometer 174 is coupled through a capacitor 120 to the base of transistor 106 (i.e., one input of differential amplifier 162). The base of transistor 106 is returned to ground through resistor 181 and the collector-emitter junction of a transistor 108. The base of transistor 108 is coupled to horizontal deflection unit 151 to receive the first horizontal blanking pulse signal via conductor 159. An NPN transistor 107, the emitter of which is coupled to the base of transistor 106, is arranged together with resistor 181 and the collector-emitter junction of transistor 108 as an emitter follower. The base of transistor 107 is coupled to horizontal deflection unit 151 to receive the second horizontal blanking pulse signal via conductor 167. It is noted that this signal may also be generated within the IC device.

Kinescope 153 may be a precision-in-line kinescope such as the RCA type 15VADTCO1. As is described in U.S. Pat. No. 3,817,397, issued May 21, 1974, there is no provision for separate adjustment of red, green and blue gun screen and grid potentials and only the cathodes of the three guns of such a kinescope are available for separate adjustment of the cut off point of the guns. As will become apparent in the following descriptin, matrix unit 100 and kinescope driver 199 are particularly suited to a kinescope of the precision-in-line type but it should be appreciated that they may be utilized for other types of kinescopes such as delta-gun, shadow mask or other slotted mask types.

In operation, the signal supplied to the base of transistor 107 during the scanning interval by horizontal deflection unit 151 is of sufficiently low amplitude (e.g., less than +4vdc) in relationship to the voltage at its emitter (controlled by the charge on capacitor 120 as will be explained) that it is non-conductive. Because of relatively low voltage applied to the bases of transistors 108 and 170 during the scanning interval, transistors 108, 170, 103 and 104 are also non-conductive and do not affect the operation of matrix circuit 100 during the scanning interval.

The signal −(R–Y), representing red color difference information, and the signal Y, representing luminance information, are coupled to amplifier 161 where they are combined in the emitter circuit of transistor 101 to form a signal −R, representing red information. The signal −R is further amplified and inverted twice by differential amplifier 162 and cascode amplifier 164 for application to kinescope 153.

It is noted that resistors 183, 176 and 177 should be selected so that zener diode 163 is biased well into its reverse breakdown region to inhibit noise.

The portion of the output signal of cascode amplifier 164 developed at the wiper arm of potentiometer 174, is capacitively fed back to one input of differential amplifier 162. This negative feedback arrangement, in conjunction with the use of cascode amplifier 199, provides for a relatively wide bandwidth, thereby eliminating the need for peaking coils or the like to improve high frequency response. The AC gain (or drive) of the matrix unit-kinescope driver arrangement may be adjusted by adjustment of the wiper arm of potentiometer 174 (normally a service or factory adjustment).

During the horizontal retrace interval, a relatively high voltage (e.g., approximately +6 vdc plus the base to emitter voltage of transistor 107 when transistor 107 is rendered conductive) is applied to the base of transistor 107 from horizontal deflection unit 151. Horizontal deflection unit 151 also applies a relatively high voltage to the bases of transistors 108 and 170. As a result transistors 107, 108, 170, 103 and 104 are rendered conductive and the base of transistor 106 is clamped to a voltage substantially equal to the voltage at the base of transistor 107 less the base emitter voltage of transistor 107 (e.g., +6 vdc). The voltage to which the base of transistor 106 is clamped is sufficiently lower than that at the base of transistor 105 so that transistor 106 will be rendered non-conductive and transistor 105 will be rendered fully conductive. Under these conditions, the voltage developed at the collector of transistor 120 will rise toward B+ to a voltage determined by the conduction of transistors 119 and 120 and the voltage division action of resistors 165, 166 and the impedance of potentiometer 167 in parallel combination with the series combination of potentiometer 174 and resistor 175.

While the base of transistor 106 is clamped to the voltage applied to the base of transistor 107 less the voltage developed between the base and emitter of transistor 107, the AC feedback provided by capacitor 120 is effectively disconnected and capacitor 120 is provided with a charging path including resistor 166 and a portion of potentiometer 174 by which it is rapidly charged to a voltage determined by the voltage at the emitter of transistor 107 and DC voltage developed at the collector of transistor 120.

The voltage developed at the wiper arm of potentiometer 167 is coupled to the base of transistor 104 and, during each horizontal retrace interval, is compared to the voltage developed at the base of transistor 103 by TCVR 169. A difference in voltage is converted by virtue of the current mirror configuration of transistors 172 and 173 into an error current at the junction of the collectors of transistors 104 and 173. The error current acts, depending on the relative levels at the bases of transistors 103 and 104, to charge or discharge capacitor 110.

Potentiometer 167 initially is adjusted to provide a voltage at the collector of transistor 120 sufficient to cut off the red gun of kinescope 153 when a black image signal is present. Therefore, it is desirable to select the values of resistors 165 and 166 and potentiometer 167 to ensure that the full range of black level control at the red cathode of kinescope 153 is available.

Matrix circuit 100 is arranged so that capacitor 110 will be charged or discharged in a manner to compensate for any change in B+. For example, if B+ decreases, the voltage developed at the base of transistor 104 will decrease relative to the stable reference voltage developed at the base of transistor 103. Therefore, the collector current of transistor 103 and the substantially equal currents flowing through the emitter-collector circuits of transistors 172 and 173 will increase, causing capacitor 110 to be charged. As a result, the voltage at the base of transistor 101 will increase, the voltage at the base of transistor 105 will increase, the voltage at the collector of transistor 105 will decrease and the voltage at the collector of transistor 120 will increase.

It is noted that transistor 173 and transistor 104 operate in what may be termed a push-pull fashion in that the change in current flowing between the emitter and collector of transistor 173 is inversely related to the change in current flowing between the collector and the emitter of transistor 104. Thus, if the current flowing through the emitter-collector of transistor 104 increases, the current through the collector-emitter of transistor 173 decreases, so that capacitor 110 is discharged by the excess of current flowing through transistor 104 rather than being charged by current from transistor 173.

Thus, the feedback arrangement including TCVR 169 of matrix unit 100 adjusts the charge on capacitor 110 to compensate for, and therefore substantially eliminate, the effect on the direct voltage applied to the kinescope cathodes of variations in B+. Furthermore, it is noted that variations in other portions of the matrix amplifierdriver arrangement (such as variations caused by temperature or component tolerance changes) affecting the DC conditions at the collector of transistor 120 will be compensated for by the arrangement in a similar manner.

The charge stored on capacitor 110 during the horizontal retrace interval serves to control the bias on cascode amplifier 164 during the succeeding scanning interval. It is noted that the charge on capacitor 110 is not affected by the color difference signals or luminance signals during the horizontal retrace interval, since these signals are arranged to be constant during the horizontal retrace interval.

After the horizontal retrace interval, transistors 103, 104, 170, 172, 173, 107 and 108 are rendered nonconductive (as previously described) and capacitors 110 and 120 begin to discharge. While capacitor 110 controls the bias voltage at the base of transistor 105, capacitor 120 controls the bias voltage at the base of transistor 106. Capacitors 110 and 120 and their associated discharging circuitry preferably are selected so that capacitors 110 and 120 discharge at substantially equal rates. The similar changes in voltage are applied to opposite sides of differential amplifer 162. The common mode rejection characteristics of differential amplifier 162 will prevent the discharging of capacitor 110 to be reflected in the DC conditions at the collector of transistor 120. This "droop" compensation feature provided by capacitor 120 in junction with differential amplifier 162 is desirable, since in its absence, capacitor 110 would have to be a relatively large value to prevent droop. This is especially undesirable if it is desired to construct matrix unit 100 as an integrated circuit because large currents, not compatible with integrated circuit technology, would be required to charge and discharge capacitor 110.

Typical values for the arrangement are shown on the accompanying drawing.

It should be noted that although the present invention has been described in terms of a particular configuration shown in the diagram, modifications may be made which are contemplated to be within the scope of the invention. For instance, cascode driver 199 may be placed with other driver stages well known in the art. Furthermore, the current mirror configuration comprising transistors 172 and 173 may be modified in accordance with other known current mirror configurations.

What is claimed is:

1. In a television receiver including an image reproducing device, a source of chrominance signals, a source of luminance signals and a source of horizontal blanking pulses, said horizontal blanking pulses occurring during the time interval during which said image reproducing device is horizontally retraced, the apparatus comprising:
   amplifying means for combining said chrominance signals and said luminance signals, said amplifying means including first and second input terminals and an output terminal, said output terminal being direct current coupled to said image reproducing device, said second input terminal being direct current coupled to said source of said luminance signals;
   first capacitive means for coupling said chrominance signals to said first input terminal;
   comparator means having first and second input terminals for comparing voltages applied thereto, said comparator means being normally inoperative;
   a relatively low level stabilized reference voltage source coupled to said first input terminal of said comparator means;
   means coupled to said second input terminal of said comparator means for providing a direct voltage proportional to the direct voltage developed at said output terminal;
   means for selectively rendering said comparator operative in response to said horizontal blanking pulses; and
   current converting means coupled to said comparator and to said first capacitive means for charging and discharging said capacitive means to a direct voltage level in relation to the difference in voltage between said first and second input terminals of said comparator means so as to counteract the changes of the voltage developed at said output terminal.

2. The apparatus recited in claim 1 wherein said amplifying means includes:
   a differential amplifier having first and second input terminals and an output terminal, said first input terminal being coupled to said first input terminal of said amplifying means, said output terminal of said differential amplifier being coupled to said output terminal of said amplifying means;
   second capacitive means coupled to said second input terminal of said differential amplifier; and
   means for selectively charging said second capacitive means during said horizontal retrace interval, said first and second capacitive means being selected to have substantially equal discharging rates during the time intervals between said horizontal retrace intervals.

3. The apparatus recited in claim 2 wherein said second capacitive means is coupled between said output terminal of said amplifying means and said second input terminal of said differential amplifier.

4. The apparatus recited in claim 3 wherein said amplifying means includes a cascode amplifier coupled between the output of said differential amplifier and said output terminal of said amplifying means.

5. The apparatus recited in claim 3 wherein said amplifying means includes first and second transistors, the emitter of said first transistor being direct current coupled to the collector of said second transistor, the base of said first transistor being coupled to said first input terminal of said amplifying means, the base of said second transistor being coupled to said second input terminal of said amplifying means, the emitter of said first transistor being coupled to said first input terminal of said differential amplifier.

6. The apparatus recited in claim 3 wherein said means for selectively charging said second capacitive means includes means for clamping the second input terminal of said differential amplifier to a predetermined voltage during said horizontal retrace interval.

7. The apparatus recited in claim 3 wherein means are provided for adjusting the portion of the voltage developed at said output terminal of said amplifying means which is coupled to said second capacitive means.

8. The apparatus recited in claim 1 wherein said means coupled to said second input terminal of said comparator means for providing a direct voltage proportional to the direct voltage developed at said output terminal of said amplifying means includes means for adjusting the voltage coupled to said second input terminal of said comparator means.

9. The apparatus recited in claim 1 wherein said comparator means includes:
   a differential amplifier having two input terminals and two output terminals, one of said input terminals being coupled to said reference voltage source, the other of said input terminals being coupled to said output terminal of said amplifier means; and
   a current mirror circuit having an input and an output, one of said output terminals of said differential amplifier being coupled to said input terminal of said current mirror circuit, the other of said output terminals of said differential amplifier being coupled to the output of said current mirror circuit and to said first capacitor means.

10. The apparatus recited in claim 1 wherein said voltage reference source is temperature compensated.

11. In a television receiver including a color kinescope leaving a plurality of electron beam forming apparatus, a source of luminance signals, a source of a plurality of color difference signals, and a source of horizontal blanking pulses, said horizontal blanking pulses corresponding to the time interval during which said electron beams are horizontally retraced, the apparatus comprising:
   a plurality of amplifiers, each of said amplifiers including
      amplifying means for combining one of said plurality of color difference signals with said luminance signals, said amplifying means including first and second input terminals and an output terminal, said output terminal being direct current coupled to a respective one of said plurality of electron beam forming apparatus, said second input terminal being direct current coupled to said source of said luminance signals, capacitive means for coupling said one of said plurality of color difference signals to said first input terminal, comparator means having first and second input terminals for comparing voltages applied thereto, said comparator means being normally inoperative, means coupled to said second input terminal of said comparator means for providing a direct voltage proportional to the direct voltage developed at said output terminal, means for selectively rendering said comparator operative in response to said horizontal blanking pulses, and current converting means coupled to said comparator and to said capacitive means for charging and discharging said capacitive means to a direct voltage level in relation to the difference in voltage between said first and second input terminals of said comparator means so as to counteract the changes of the voltage developed at said output terminal; and a relatively low level stabilized reference voltage source coupled to said first input terminals of each of said plurality of comparator means.

* * * * *